Feb. 9, 1971 R. RESZ ETAL 3,562,234
PRODUCTION OF A GRANULATE OF A GIVEN PARTICLE SIZE FROM
SAPONIFIED ETHYLENE-VINYL ACETATE COPOLYMERS
Filed May 15, 1967 2 Sheets-Sheet 1

(WATER JET TO COMMINUTE FILAMENTS)

(HIGH SPEED STIRRING TO COMMINUTE FILAMENTS)

INVENTORS:
RAOUL RESZ, WALTER OETKE, RUDOLF ERDMENGER, HERBERT BARTL
BY Connolly and Hutz
Their attorneys

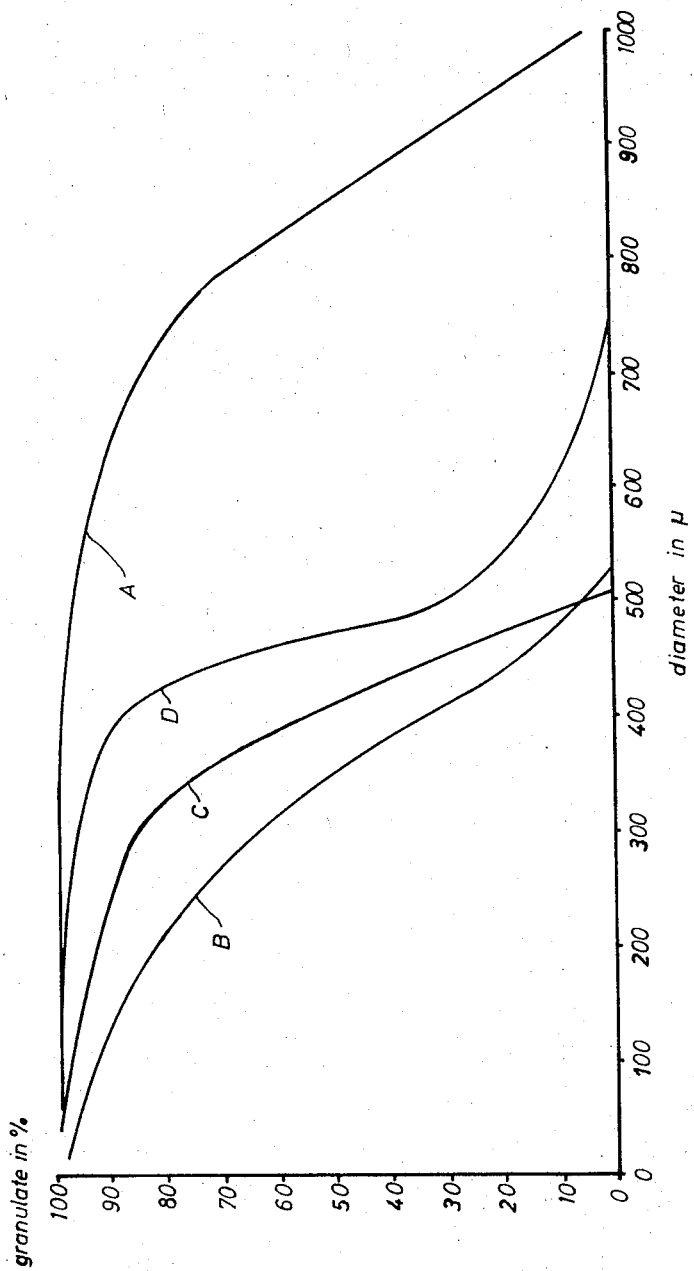

United States Patent Office 3,562,234
Patented Feb. 9, 1971

3,562,234
PRODUCTION OF A GRANULATE OF A GIVEN PARTICLE SIZE FROM SAPONIFIED ETHYLENE-VINYL ACETATE COPOLYMERS
Raoul Resz, Cologne-Stammheim, Walter Oetke, Leverkusen, Rudolf Erdmenger, Bergisch Gladbach, and Herbert Bartl, Cologne-Stammheim, Germany, assignors to Farbenfabriken Bayer Aktiengesellschaft, Leverkusen, Germany, a corporation of Germany
Filed May 15, 1967, Ser. No. 638,362
Claims priority, application Germany, July 29, 1966, F 49,830
Int. Cl. C08f 27/14
U.S. Cl. 260—87.3
3 Claims

ABSTRACT OF THE DISCLOSURE

Process for the production of partially or completely saponified ethylene-vinyl acetate copolymers having a particle size of 0.1 to 0.7 mm. and apparatus therefor, the process involving gelling hot saponification solution containing organic solvent by cooling, extruding gelled solution to form filaments of specified diameter, producing particles of specified length from said filaments, removing organic solvent and saponification catalyst from said particles and isolating resulting copolymer particles.

---

Figure 1:
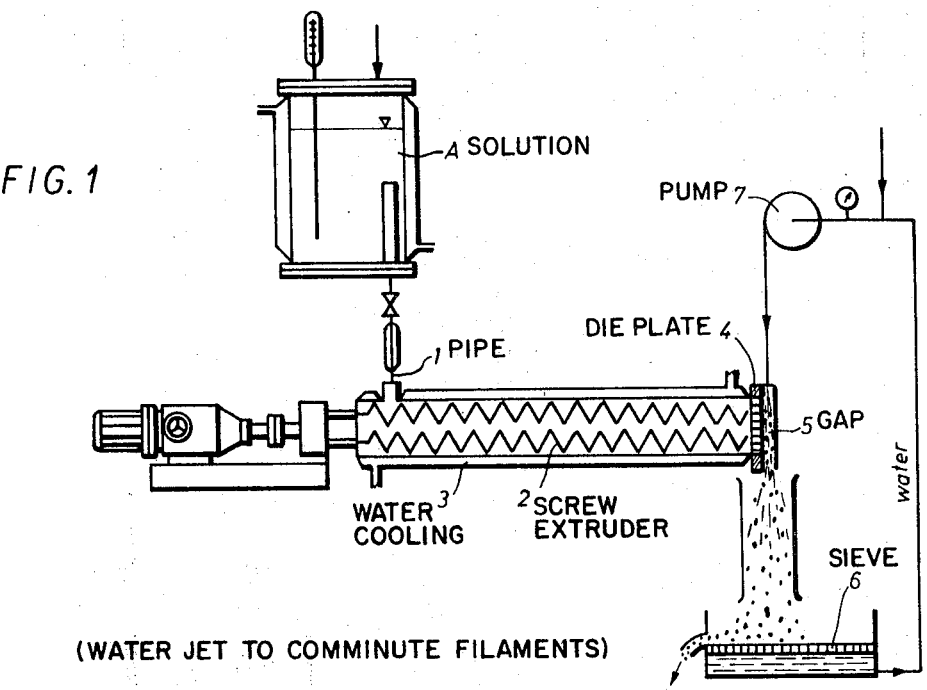

This invention relates to a new process for the production of partially or completely saponified ethylene-vinyl acetate copolymers having a particle size of 0.1 to 0.7 mm. and an apparatus for carrying out the new process.

German Auslegeschrift 1,222,887 described ethylene-vinyl acetate in which at least 50% of the acetate groups are saponified, and which prior to saponification contained ethylene and vinyl acetate in a molar ratio of 50:1 to 4:1, which copolymers are particularly suitable for the production of solvent-resistant seals for textile sheet structures by heat sealing. In practice, it is often desired to impart a resistance of aliphatic hydrocarbons and tri- and perchloro-ethylene at temperatures of about 80° C. to the textile sheet structures. In the usual heat sealing process, the copolymeric material is ground to a suitable particle size and applied evenly to a fabric, and a second fabric is placed on this and ironed at temperatures of about 100 to 180° C. The particle size of the synthetic resin powder which is preferably used for this purpose is from 0.1 to 0.7 mm. Products having a particle size of less than 0.1 mm. do not form satisfactory bonds between textiles surfaces because most of the sealing material is absorbed by the fabric to such an extent that it can no longer fulfill this function. A substance having a substantially larger particle size than 0.7 mm. diameter, on the other hand, causes the bonding of the textiles to each other to be uneven, and, owing to the larger areas of sealed patches, it causes in stiffening of the fabrics that are sealed together. Textile sealed with polymer powder of particle size of 0.1 to 0.7 mm. however, show good resistance to air and moisture and have a pleasant soft handle.

By saponification of ethylene-vinyl acetate copolymers is meant the exchange of the acetyl groups in the copolymer for hydrogen atoms.

This is preferably effected by alcoholysis, i.e. by transfer of the acetyl radicals to aliphatic primary or secondary alcohols having 1 to 10 carbon atoms, in the presence of known acid or alkaline ester interchange catalysts such as hydrogen chloride, sulphuric acid, p-toluenesulphonic acid or alkali metal hydroxides or alkali metal alcoholates of aliphatic alcohols having 1 to 10 carbon atoms. Water may also be present in small quantities. Larger quantities of water, on the other hand, prevent formation of uniformly saponified ethylene-vinyl acetate copolymers. Saponification may be carried out partially or completely, and the degree of hydrolysis can be influenced by the reaction time, the reaction temperature and the type and quantity of ester interchange catalyst added. In order to achieve complete alcoholysis, the readily volatile ester of the aliphatic alcohol added is preferably removed from the ester interchange equilibrium by distillation.

Instead of using ethylene-vinyl acetate copolymers, copolymers of ethylene with vinyl esters of aliphatic or aromatic carboxylic acids having 1 to 20 carbon atoms, e.g. vinyl formate, propionate, butyrate or benzoate and vinylidene carbonate may also be subjected to saponification. Saponified ethylene-vinyl acetate copolymers are preferably used however, in the process described herein owing to their easy accessibility.

Saponification of ethylene-vinyl aceate copolymers of the above mentioned composition may be performed in primary or secondary aliphatic alcohols having 3 to 10 carbon atoms, or in mixtures of primary or secondary aliphatic alcohols having 1 to 10 carbon atoms and under the conditions for saponification in inert organic solvents.

Organic solvents which may be used include, aliphatic hydrocarbons such as petroleum ether, cleaning petrol and cyclohexane, aromatic hydrocarbons such as benzene, toluene and xylene and chlorinated aliphatic hydrocarbons such as chloroform, trichloroethylene and perchloroethylene. Saponification of ethylene-vinyl acetate copolymers is preferably carried out in mixtures of toluene or xylene in the presence of methyl or ethyl alcohol. All these saponification solutions have the property of solidifying, when cooled to below about 50 to 60° C., to a gelled mass which varies in the firmness of its consistency according to the molecular weight of the polymers, the concentration of polymers in the solution and the nature of the solvent.

The present invention relates to a new process for the production of saponified ethylene-vinyl acetate copolymers of given particle sizes by isolating them from their saponification solutions. Processes for isolating such polymers from their saponification solutions have already been described, but they all have serious disadvantages. In particular, in these processes, the ethylene-vinyl acetate copolymer cannot be obtained in a finely divided form, i.e. as granulate of particle size, in a single working stage.

The invention also relates to an apparatus for carrying out the new process.

Figure 2:
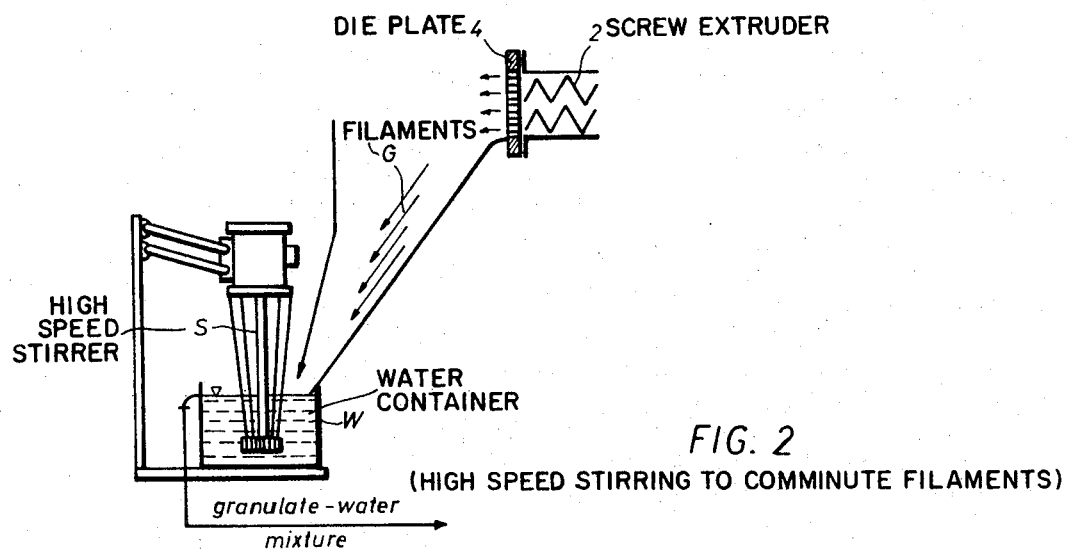

In the drawings:

FIG. 1 is a schematic representation of one embodiment of apparatus suitable for the instant invention, FIG. 2 schematically represents another embodiment of the instant invention and FIG. 3 graphically illustrates particle size distribution obtained in accordance with preferred embodiments of the instant invention.

Examples of known processes are given below:

(1) According to one known process, the solvent is evaporated at temperatures of about 120 to 200° C., and the molten saponification product is extruded through apertures and granulated. By this process, a tough, compact and relatively coarse-grained granulate is obtained which cannot be used in this form for heat sealing textiles. In order to obtain a power of sutiable particle size of 0.1 to 0.7 mm., the granulates must be ground to the desired degree of fineness in a plastics mill. The grinding operation entails serious difficulties owing to the toughness of these substances. Moreover, this process of isolation does not provide an opportunity to simultaneously remove non-volatile or dicultly volatile residues of catalysts, e.g. of sulphuric acid, sodium methylate etc.

(2) According to another known process, the organic solvents are removed by steam distillation at normal pressure. This process has the disadvantage that the saponification product sticks together during distillation to form shapeless, comparatively large lumps which are also very tough and difficult to break up in the plastics mill. Complete removal of residues of solvent from these large, compact, caked lumps by steam distillation is either impossible or requires very long distillation times. Moreover, the caked lumps of polymer include residues of saponification catalysts which cannot be removed by washing with water.

(3) According to another known process, saponified ethylene-vinyl ester copolymers in which ethylene and vinyl acetate were present in a molar ratio of 1:1 to 4:1 before saponification are isolated by bringing the saponification solution together with a current of steam of high flow velocity in a suitable apparatus so that the solvent evaporates rapidly and the saponification product is obtained in the form of a granular, easily handled and easily washed, loose material. To prevent caking together of the saponified polymer during isolation, the addition of protective colloids such as starch to the aqueous phase is necessary in this case. Coarse grained, tough precipitation products made up of particles of uneven size are obtained in this isolation process. In order to obtain a powder of particle size of 0.1 to 0.7 mm. from these precipitation products, they also must be ground, at least partly in a plastics mill. Another disadavntage of this precipitation process is the need for addition of a protective colloid since complete removal of such a colloid from the porous particles can only be achieved by prolonged washing. The use of this precipitation method for isolating saponified ethylene-vinyl acetate copolymers which prior to saponification contained more ethylene than does a copolymer which had an ethylene-vinyl acetate molar ratio of 4:1 is not possible owing to the substantially lower softening point and greater tackiness of such polymers. Another disadvantage of this process is that only solutions of relatively low viscosity can be worked up: solutions of high viscosity must be diluted before isolation.

A process has now been found for the production of ethylene vinyl acetate copolymers in which at least 50% of the acetyl groups are saponified, and having a particle size of 0.1 to 0.7 mm. which contained ethylene and vinyl acetate in a molar ratio of 4:1 to 50:1 before saponification, by isolation from their saponification solutions, which process is characterised in that the hot saponification solution which contains organic solvents is allowed to gel by cooling to temperatures below 60° C., filaments 0.3 to 5 mm. in diameter are produced from the gelled solution, the resulting filaments are broken down to pieces 0.1 to 5 mm. in length in water or with water, the resulting gel particles are freed from the organic solvents at temperatures of 20 to 80° C. under reduced pressure, any saponification catalysts present are washed out, and the copolymer is isolated and, if deired, subjected to an additional grinding process.

Saponified ethylene-vinyl acetate copolymers in which at least 50% of the acetyl groups are saponified which prior to saponification contained ethylene and vinyl acetate in the molar ratio of 4:1 to 50:1 and which are present in solution in an organic solvent are obtained particularly advantageously in pulverulent form of particle diameter 0.1 to 0.7 mm. by letting the saponification solution gel by cooling it below 60° C. in a screw or kneading machine, extruding the gelled solution through a die plate which has apertures of 0.3 to 5 and preferably 0.5 to 1 mm. diameter, breaking up the filaments obtained in this way from the gelled solution to pieces of 0.1 to 5 mm. and preferably 0.3 to 1 mm. in length by any desired method, immersing these filaments in water, removing the organic solvents adhering to them by steam distillation at diminished pressure and at tempertaures of 20 to 80, preferably 40 to 70° C., and washing out any non-volatile or difficultly volatile saponification catalysts still present with water. If desired, the isolated product can then be further broken down by grinding. The resulting pulverulent copolymers are free from organic solvents and do not contain any impurities such as residues of catalysts or protective colloids. They are therefore particularly suitable for use as heat sealing materials for textiles.

The filaments leaving the die plate, have a soft consistency and are easily cut, and are broken up into pieces 0.1 to 5 mm. and preferably 0.3 to 1 mm. in length by means of a water jet which is sprayed under pressure towards the die apertures in a direction parallel to the die plate. The fine grained jelly obtained in this way suffers a shrinkage of about 20 to 50% of its volume when isolated by the method of vacuum steam distillation described in detail hereinafter, but substantially retains its shape. When using a die plate having bores of 0.1-1 mm. dilameter, the process according to the invention yields a finely divided suspension of the gelled solution in water which is excellently suitable as heat-sealing material for textiles after removing organic solvents and residues of catalyst by steam distillation or by washing in dry condition. In this case the product need not be ground.

The extruded filaments can also be broken up by means of a high-speed stirrer arranged behind the die plate or by using any cutting mechanism, e.g. granulating knives, or a screen made of thin wire which is moved at high velocity in front of the apertures of the die plate. The two-dimensionally shaped filaments prepared from the gelled solution can also be conveyed to any disintegration device of the aforesaid kind which is arranged in spaced relationship from the screw extruder.

An apparatus suitable for use in the production of uniformly granular material of 0.1 to 5 mm. particle diameter by the process according to the invention is shown in FIG. 1 of the accompanying drawings. The saponification solution A at a temperature of 50 to 100° C. is introduced through a pipe 1 into a screw extruder 2 which has two screw shafts. In the screw extruder, the solution gels under the effect of the water cooling means 3 and is compressed and forced against the die plate 4 under a pressure of 2 to 50 atmospheres. The substance leaves the screw extruder through die apertures gauge, which have the desired diameter of 0.1 to 5 mm., in the form of an endless filament of low mechanical strength. This filament is broken up according to a first preferred modification of the process by the water sprayed through a gap 5 under a pressure of 3 to 50 excess atmospheres which breaks the filament into 0.1 to 1 mm. long cylindrical pieces. The length of the pieces torn off the filament depends on the delivery rate of the screw extruder and the pressure, i.e. the flow velocity of the water sprayed on the filaments. The broken up gelled solution is separated from the water by a sieve 6 and continuously removed from the latter. The water which drips down is sprayed back to the die plate by means of a pump 7. The temperature of the water circulated by the pump is maintained below 50° C. by cooling. The broken up gelled solution is then freed from solvent and any residues of catalyst still present, by steam distillation and washing as described hereinafter, and the powder thereby obtained is dried using known procedures.

According to a second modification of the process the filaments G (see FIG. 2 and Example 3) produced with the use of the screw extruder 2 are introduced into a container W containing water and are cut up into particles of 0.3 to 1.0 mm. in length using an adjacent high speed stirrer S. Isolation of the granulate is performed in a manner as described.

Suitable solvents for the saponified ethylene-vinyl acetate copolymers which are isolated by the process described herein are primary, secondary and tertiary aliphatic alcohols having 3 to 10 carbon atoms, such as n-propanol, isopropanol, n-butanol, isobutanol, tertiary butanol, the various isomeric amyl alcohols and hexyl alcohols or mixtures of these with various organic solvents which are inert under the conditions of saponification. Examples of such solvents are petroleum ether fractions of boiling point 20 to 200° C., cyclohexane, benzene, toluene, xylene, chlorobenzene, chloroform, trichloroethylene, perchloroethylene, dioxane, tetrahydrofuran, etc. The solutions formed on saponification of ethylene-vinyl acetate copolymers are advantageously worked up by the process described here. These solutions may contain the acetate of the alcohol used in addition to the solvents used. The acid or alkaline saponification catalyst present in the saponification solution, e.g., hydrogen chloride, sulphuric acid or sodium methoxide, may be neutralised in known manner before isolation, e.g., with propylene oxide, ammonia or acetic acid. This is not, however, always necessary. If desired, part of the solvent present may be removed by distillation before application of the process. To ensure that disintegration of the gelled saponification solutions by the method described above will proceed smoothly and give satisfactory results, the nature of the gelled solution is of great importance. It should not be too viscous and should be capable of being conveyed through the screw extruder in the cold and of being easily cut up. The concentration of the solution intended for isolation should therefore be adjusted to the molecular weight and character of the solvents used, both of which factors influence the toughness of the gelled solution. If the concentration of the saponification solution is low, the gelled mass will be too soft and will disintegrate on steam distillation to form a powder with an average particle size substantially below 0.1 mm. This method of procedure is therefore suitable for the production of finely powdered products. The breaking down of highly concentrated solutions of saponification products gives rise to considerable difficulties owing to the viscosity of the gelled solution. A suitable concentration of the polymer in the saponification solutions for the isolation process described herein is from 10 to 60% by weight and preferably 20 to 40% by weight.

The conditions under which steam distillation of the gelled and broken down solutions of the saponified ethylene-vinyl acetate copolymers is carried out are also of decisive importance in the successful isolation of a substance in which the particles are not stuck together. The temperature of the suspension must not, during the distillation period, exceed that temperature at which the polymer particles begin to stick. This temperature differs slightly according to the composition of the saponification product and of the solvent mixture. It generally lies between 50 and 80° C. If this temperature is exceeded, especially in the initial phase of distillation, when there is still a large amount of solvent in the product, then the entire polymer cakes together into large lumps. The extent of the vacuum applied during distillation depends on the permissible internal temperature; it is normally in the region of 100 to 200 mm. Hg. The steam distillation may be carried out intermittently or, preferably, continuously.

The precipitated, washed and dried saponification product has a porous structure and is relatively soft, but is dimensionally stable. If desired, it can very easily and rapidly be ground to a comparatively small particle size. Various makes of plastics mills are suitable, a Pallmann mill being used for preference.

Owing to their uniform particle size, the products isolated by the process described herein are eminently suitable for use as heat-sealing materials for textiles, and also for bonding paper, wood and plastics. Another field of application is the coating of articles, in particular of metal, by the dip or spray process. These coatings have better adhesion, higher strength and better solvent resistance than coatings produced from polyethylene powders.

EXAMPLE 1

This example illustrates the isolation of a copolymer which has been saponified up to 94%. It was obtained by saponification of an ethylene-vinyl acetate copolymer in which the molar ratio of ethylene to vinyl acetate in the polymer was initially 7.9:1. The melt index of the starting material was 96 g./10 min. (determined according to ASTM specification D1238–62 T condition at 190° C.). This saponification solution consisted of 35.0 parts by weight of copolymer, 44.5 parts by weight of toluene, 10.3 parts by weight of methanol, 9.3 parts by weight, of methyl acetate and 0.9 part by weight of sodium methoxide.

The saponification solution of the composition indicated above is gelled at about 60° C. in the screw extruder already described (see FIG. 1), extruded through the die apertures of 1 mm. diameter in the die plate, and sheared off with a water jet at 3 atmospheres gauge pressure. The output of the crew is about 50 kg. of saponification solution per hour. Cylindrical gelled particles of 0.5 to 1.5 mm. in length are obtained.

The finely granulated jelly separated from the water by a sieve is then sprayed, with stirring, into a high grade steel tank equipped with stirrer and distillation bridge, which tank contains double the quantity of water. The apparatus is evacuated to a pressure of 160 mm. Hg, and the steam under reduced pressure and at a temperature of 70 to 80° C. is introduced into the mixture with rapid stirring. Distillation soon sets in, mainly methyl acetate and methanol together with small quantities of toluene and water distilling off first, leaving by the azeotropic mixture of toluene and water. During this process, the temperature of the mixture gradually rises to 60 to 65° C. Distillation is stopped as soon as the distillate consists of pure water. The shape of the preformed particles is largely maintained during distillation, only a slight shrinkage of about 20 to 30% of the original volume being observed. The particles do not stick together during distillation. After filtering off, washing and drying, an easily handled, porous, soft material free from organic solvents and residues of catalyst is obtained which can very easily be converted into a suitable particle size for heat sealing textiles by grinding it in a suitable plastics mill. The distribution of particle sizes of this ground product is shown in Table 1 and FIG. 3. The major portion of the product is in the optimum particle size region for heat sealing material of 0.1 to 0.7 mm. diameter.

EXAMPLE 2

A saponification solution having the same composition as that used and described in Example 1 is gelled in the screw extruder 2 already described above (see FIG. 1), extruded through the approximately 50 die apertures of 0.5 mm. diameter in the die plate 4, and sheared off with a water jet at 10 atmospheres excess pressure. The output of the screw is about 30 kg. of saponification solution per hour. Cylindrical gelled particles of length 0.3 to 1.0 mm. are obtained.

The finely granulate jelly separated from the water by a sieve is mixed with water as described in the Example I and subjected to steam distillation at reduced pressure. After filtering off, washing and drying, a product with very narrow particle size distribution is obtained. It is free from particlees that have a diameter above 0.5 mm.; the proportion of very fine particlees is very small. The granules have a porus structure but are sufficiently firm and can be sprayed satisfactorily. The precipitated material need not be ground again and is particularly suitable for point by point glueing of textiles. The particles size distribution of the product is shown in Table 1 and FIG. 3.

EXAMPLE 3

A saponification solution having the same composition as that used in Examples 1 and 2 is converted by the process described in Example 2, with the use of a screw extruder 2, into filaments G of circular cros-ection of diameter 0.5 mm. and these filaments are introduced into a container W containing water and are cut up into a container W containing water and are cut up into particles of 0.3 to 1.0 mm. in length using an adjacent high speed stirrer S (see FIG. 2). Isolation of the synthettic resin powder is performed in a manner analogous to Examples 1 and 2. By this process, employing the same conditions, about half (ca. 15 kg. of solution per hour) of the output obtained in Example 2 can be achieved. The particle size distribution of the product is shown in Table 1 and FIG. 3. The synthetic resin powder obtained, is suitable, similarly to the material obtained in Example 2, for immediate use for heat sealing textiles.

TABLE 1

Particle size distribution of saponified ethylene-vinyl acetate copolymers, which have been isolated according to Examples 1 to 3.

| Particle size in microns | I Example 1, percent A | II Example 1 (ground), percent B | III Example 2, percent C | IV Example 3, percent D |
|---|---|---|---|---|
| >1,000 | 3.2 | | | |
| 800–1000 | 62.6 | | | |
| 630–800 | 24.2 | 1.5 | | 0.6 |
| 500–630 | 6.5 | 22.3 | 1.3 | 27.8 |
| 400–500 | 1.9 | 33.0 | 50.4 | 60.8 |
| 315–400 | 0.6 | 19.4 | 32.7 | 8.2 |
| 200–315 | 0.4 | 19.2 | 7.2 | 2.0 |
| 100–200 | 0.4 | 4.0 | 5.2 | 0.4 |
| >100 | 0.2 | 0.6 | 3.2 | 0.2 |

In FIG. 3, Curve A repersents Example 1 (not ground); Curve B represents Example 1 (ground); Curve C represents Example 2; Curve D represents Example 3.

We claim:

1. A process for producing saponified ethylene-vinyl acetate copolymers, said process comprising saponifying at least 50% of the acetate groups of an ethylene/vinyl acetate copolymer having an ethylene to vinyl acetate molar ratio of 50:1 to 4:1 to obtain a hot saponification solution containing organic solvent with a saponified polymer concentration of 10 to 60% by weight, gelling said hot saponification solution by cooling it to a temperature below 60° C., extruding gelled saponification solution in the form of filaments having a diameter of 0.3 to 5 mm., breaking said filaments in aqueous medium to particles of a length of 0.1 to 5 mm. by impinging a stream of aqueous medium under elevated pressure against said filaments in a direction substantially perpendicular to their length and as they are extruded, removing organic solvent from said particles by steam distilling at a temperature of 20 to 80° C. and at a pressure of about 100 to 200 mm. Hg., washing out any residual saponification catalyst which is present and recovering resulting saponified copolymer particles.

2. The process of claim 1 wherein recovered saponified catalyst particles are ground to reduce the particle size thereof.

3. The process of claim 1 wherein said saponified polymer concentration is from 20 to 40% by weight.

References Cited

UNITED STATES PATENTS

| | | | |
|---|---|---|---|
| 2,703,794 | 3/1955 | Roedel | 260—87.3 |
| 2,759,914 | 8/1956 | Kenyon et al. | 260—91.3 |
| 3,042,970 | 7/1962 | Terenzi | 18—47.3 |
| 3,248,455 | 4/1966 | Harsch et al. | 260—879 |
| 3,244,688 | 4/1966 | Goins | 260—94.9 |
| 3,324,510 | 6/1967 | Kleeb | 18—12 |
| 3,341,623 | 9/1967 | Hahn | 260—880 |
| 3,414,640 | 12/1968 | Garetto et al. | 264—13 |

JOSEPH L. SCHOFER, Primary Examiner

J. C. HAIGHT, Assistant Examiner